United States Patent
Koltsidas

(10) Patent No.: US 9,996,542 B2
(45) Date of Patent: Jun. 12, 2018

(54) CACHE MANAGEMENT IN A COMPUTERIZED SYSTEM

(71) Applicant: International Business Machines Corporation, Armonk, NY (US)

(72) Inventor: Ioannis Koltsidas, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 14/305,332

(22) Filed: Jun. 16, 2014

(65) Prior Publication Data
US 2015/0067001 A1    Mar. 5, 2015

(30) Foreign Application Priority Data

Aug. 30, 2013  (GB) .................................. 1315435.6

(51) Int. Cl.
*G06F 17/30*    (2006.01)

(52) U.S. Cl.
CPC .............................. *G06F 17/30132* (2013.01)

(58) Field of Classification Search
None
See application file for complete search history.

(56) References Cited

U.S. PATENT DOCUMENTS

| | | | |
|---|---|---|---|
| 6,219,693 B1 | 4/2001 | Napolitano et al. | |
| 8,285,927 B2 | 10/2012 | Flynn et al. | |
| 8,370,577 B2 | 2/2013 | Sheaffer et al. | |
| 9,158,540 B1* | 10/2015 | Tzelnic | G06F 3/06 |
| 2002/0083120 A1 | 6/2002 | Soltis | |
| 2010/0049921 A1 | 2/2010 | Aronovich et al. | |
| 2011/0145307 A1 | 6/2011 | Ananthanarayanan et al. | |
| 2012/0110247 A1 | 5/2012 | Eleftheriou et al. | |
| 2012/0215970 A1* | 8/2012 | Shats | G06F 12/0866 711/103 |
| 2012/0304171 A1 | 11/2012 | Joshi et al. | |
| 2013/0019067 A1 | 1/2013 | Vilayannur et al. | |
| 2013/0086324 A1* | 4/2013 | Soundararajan | G06F 12/0813 711/122 |
| 2013/0086330 A1 | 4/2013 | Baddepudi et al. | |

(Continued)

FOREIGN PATENT DOCUMENTS

| | | |
|---|---|---|
| WO | 2011031796 | 3/2011 |
| WO | 2012116117 | 8/2012 |

OTHER PUBLICATIONS

Sourlas et al., "Effective cache management and performance limits in information-centric networks," 2013 International Conference on Computing, Networking and Communications (ICNC), San Diego, CA, Jan. 2013, 6 pages.

(Continued)

*Primary Examiner* — Anh Tai Tran
(74) *Attorney, Agent, or Firm* — VanLeeuwen & VanLeeuwen; Mercedes L. Hobson

(57) ABSTRACT

A clustered computerized system includes a set of hosts, network infrastructure for interconnecting the hosts of the set, and a clustered file system shared between the hosts of the set. A solid state memory is assigned to each host of the set. The computerized system is configured to cache data in the solid state memories, and is configured to include metadata of the cached data in the clustered file system.

16 Claims, 5 Drawing Sheets

(56) References Cited

U.S. PATENT DOCUMENTS

| | | | | |
|---|---|---|---|---|
| 2013/0110961 A1* | 5/2013 | Jadhav | ................. | G06F 15/167 709/213 |
| 2013/0132967 A1* | 5/2013 | Soundararajan | ...... | G06F 9/5066 718/104 |
| 2013/0339786 A1* | 12/2013 | Samanta | ............. | G06F 11/1666 714/6.23 |
| 2014/0068181 A1* | 3/2014 | Mridha | ............... | G06F 12/0871 711/114 |

OTHER PUBLICATIONS

Xiao et al., "An Out-of-band Approach to SAN-level Cache Management," 14th NASA Goddard, 23rd IEEE (MSST2006) Conference on Mass Storage Systems and Technologies, College Park, Maryland, May 2006, 6 pages.

Search Report for GB1315435.6, UK International Property Office, dated Jan. 27, 2014, 5 pages.

* cited by examiner

CACHE MANAGEMENT IN A COMPUTERIZED SYSTEM

FIELD OF THE INVENTION

The present invention relates to a clustered computerized system and to a method for operating a clustered computerized system.

BACKGROUND

To accommodate the ever-increasing storage needs of users and applications, the capacity of storage systems is constantly growing. In light of this, the scalability of storage systems in terms of performance is critical not only for existing applications, but also for new types of applications that expect improved latency and throughput. Caching on DRAM memory has traditionally been one of the most straightforward ways of improving the performance of storage systems, both in terms of latency and throughput. By increasing the size of the DRAM cache as one adds more disks, one can maintain the same performance over capacity ratio. However, DRAM caches cannot scale in terms of size: Not only does DRAM memory require a lot of power even when it is idle, but also it is volatile by nature, meaning that it has to be backed by batteries to protect against power failures.

SUMMARY

According to one aspect of the invention, a clustered computerized system includes a set of hosts, a network infrastructure for interconnecting the hosts of the set, a clustered file system shared between the hosts of the set, and a solid state memory assigned to each host of the set. The computerized system is configured to cache data in the solid state memories, and is configured to include metadata of the cached data in the clustered file system.

Another aspect of the invention is a method for operating a clustered computerized system, the clustered computerized system including a set of hosts and a network infrastructure for interconnecting the hosts of the set, where the method includes caching data in one or more solid state memories assigned to the hosts of the set, and including metadata of the cached data in a clustered file system shared between the hosts of the set.

Another aspect of the invention is a computer program product including a computer readable medium having computer readable program code embodied therewith, the computer readable program code configured to perform a method for operating a clustered computerized system as described herein.

Embodiments described in relation to the system shall also be considered as embodiments disclosed in connection with any of the other categories such as the method, the computer program product and vice versa.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
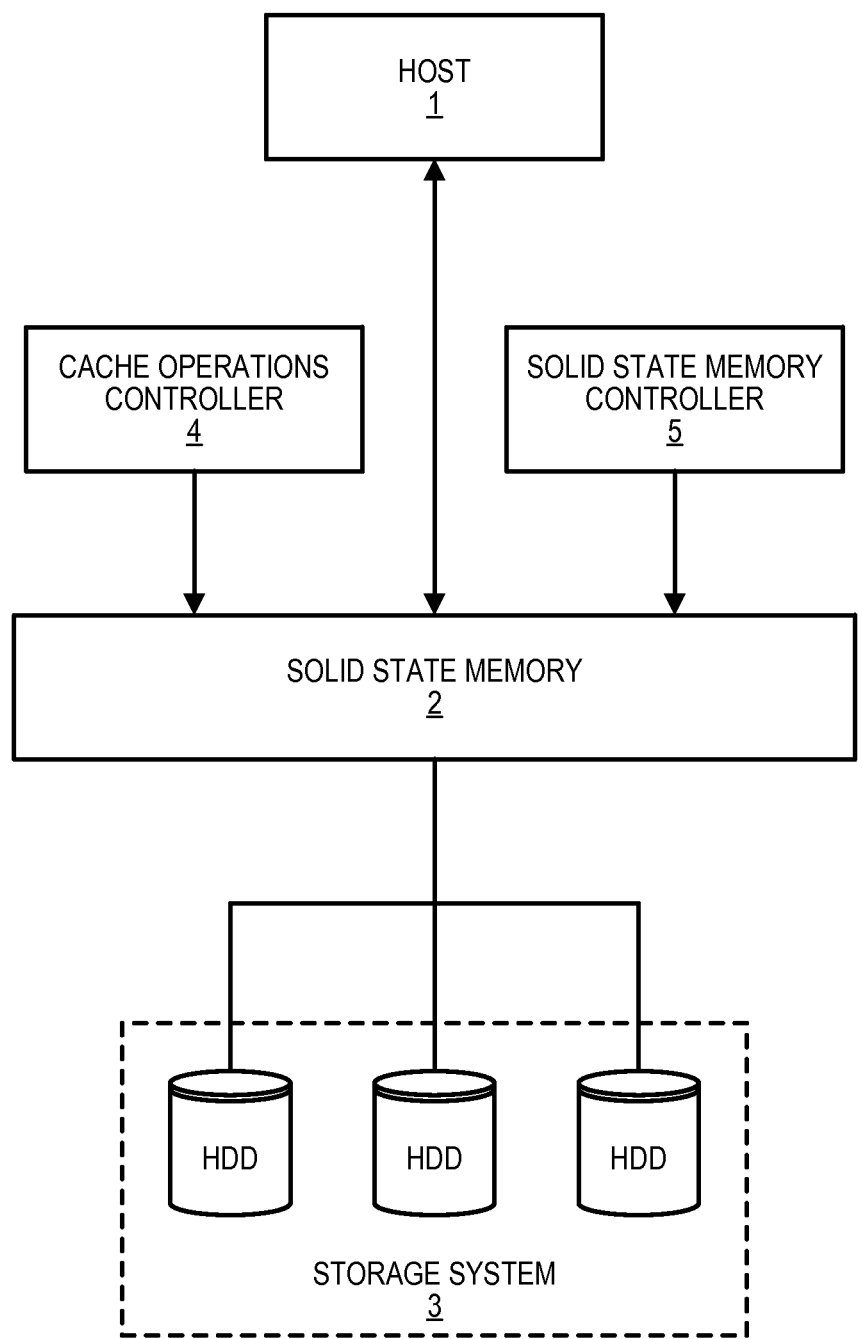
FIG. 1 is a block diagram of a computerized system according to an embodiment of the present invention.

A solid-state memory in general, and a solid state drive (SSD) in particular, includes a rewritable non-volatile memory which uses electronic circuitry such as NAND flash memory for storing data. Given that solid state memories offer exceptional bandwidth resulting in high throughput, as well as excellent random I/O (input/output) performance resulting in low latency, along with an appreciated robustness due to lack of moveable parts, they are often used as a cache medium.

Solid state memories may be characterized in that data can be stored therein in units. A unit may be an entity in the solid state memory device for writing data to and reading data from. Multiple of such units may form a block. A block may be defined as a set of multiple units. In some solid state memory devices, a block denotes the smallest entity for erasure operations which includes that the data of all units of a block may only be erased altogether.

In the following, the terminology of flash technology is often used, although it is understood that any such disclosure shall be applicable to other solid state memory technologies, too, such as DRAM, Phase-Change Memory or any other type of storage that can be used to support the cache. Specifically, in NAND flash technology, units are denoted as pages, multiple of which units form a block. Hence, read and write operations can be applied to pages as a smallest unit of such operation, and erase operations can only be applied to entire blocks. And while in other storage technologies outdated data can simply be overwritten by new data, flash technology requires an erase operation before new data can be written to an erased block. Because in flash technology erase operations take longer than read or write operations and can be carried out only at a block granularity, a writing technique is applied called "write out of place" in which new or updated data is written to some free page offered by a free page allocator instead of writing it to the same page where the outdated data resides. The page containing the outdated data is invalidated in this process.

At some point in time, a process called "garbage collection," performed by a software, hardware, or firmware entity denoted as garbage collector, frees blocks for new writes by selecting a block from a set of blocks holding data and moving the content of all valid pages of that block to free pages in different blocks. As a result, the subject block finally includes invalid pages only and can be erased. While this procedure requires some additional write operations, it is apparent that by using such an approach, immediate as well as frequent erase operations are avoided which would contribute to a much higher overall processing than does the overhead of some additional write operations involved in garbage collection. A block reclamation scheme may be based on a cyclic buffer, a greedy window, a container marker scheme, or others.

Summarizing, solid state memory typically is used in a log-structured way given that it is to be erased before it can be re-written. Writing a solid state memory in a log-structured way hides a high latency introduced by erase operations but leads to write amplification, i.e., a unit of actual user/host write may lead to more than one unit of actual memory write due to data relocation operations required upon garbage collection, where garbage collection refers to the background process of reclaiming memory space occupied by invalid data by relocating valid data in that memory space to another place.

In one embodiment, a solid state memory is used as a cache for a storage system. The storage system may comprise one or more hard disk drives as storage media, or one or more optical disk drives, or one or more solid state drives, or a mix of such drives of different technology, and may represent a mass storage for an enterprise storage system, for a personal storage system, or for a web based (cloud) storage system, for example. An entity accessing such cache may be a host, and specifically the operating system of such host. The usage of a solid state memory as a cache in a computerized system may improve the performance of the computerized system. The solid state memory may reside in one or more of the host, the storage system, or elsewhere.

When one or more SSDs collectively building a solid state memory used as a cache with respect to a host system, a controller including cache management code logic may be embodied in a controller of a host system accessing the storage system. The SSDs may be organized in a single logical address space using RAID or any other scheme. In one embodiment, the solid state memory cache stores its data on the SSDs, while the metadata for the cache may be stored in a DRAM memory or on the SSDs themselves, along with the data.

In conventional caches, it may be preferred not to store arbitrary data but only selected data because of the limited size of the cache. It may be preferred to only store data in the cache that is accessed rather often. This data is also denoted as "hot" data in the context of caching. By admitting only data that has been classified as "hot" into the cache, the rate of population writes to the cache can be significantly reduced, effectively allowing for a better read bandwidth. This approach is also denoted as selective caching. In case the cache is a solid state memory, a smart approach as to the selection of data to be admitted/added/written to the cache also leads to a longer lifetime of the device in view of the write amplification in solid state devices. At the same time, a cache-hit ratio is increased due to a reduced cache pollution resulting in an increased system performance.

Today, clustered computerized systems are often applied for implementing a distributed architecture. In a clustered computerized system, multiple computers are coupled together by means of an interconnect network. A computer of a cluster typically is a server computer, which computers are also denoted as hosts in the context of the cluster, or as node. Typically, each host runs its own operating system, however, an application may run on multiple hosts in parallel, for example, and associated data may be stored on storage systems attached to the various hosts. Systematically, it is then desired to provide a cache for each host of the clustered computerized system, where each cache may be embodied as a solid state memory residing in the host, in the storage system, or interconnected in between the host and the storage system.

However, conventionally caches across different hosts are typically not clustered with one another. This means that the application that runs on different hosts but operates on the same data—which data may be stored on a SAN, for example—may require an extra effort in synchronizing the data cached across the different hosts. For example, a write of data originating from one of the hosts would need to invalidate cached data in the caches of the other hosts.

A possible approach to this problem may be to use the SAN storage controller as a server in the cluster for updating metadata across all the caches in case of a SAN being used as a storage system. However, a specific storage controller then has to be used. In a different approach, the caches in the clustered computerized system are clustered together over a different network than the SAN e.g., over Ethernet. However, the investment required to develop the clustering and coherence management components for such cache cluster is significant, both in terms of resources and in terms of time.

Hence, it is presently proposed to use an existing clustered file system in the clustered computerized system for the purpose of cache maintenance and management. The file system is understood as a file system shared between the multiple hosts of the set, such that a user working on the file system is not aware of the various directories, files, and data of the file system that may be stored at different hosts.

Such a file system is used for storing metadata of the cached data in the various solid state memories therein in order to be transparent to all the other hosts. In one embodiment, only metadata of the cached data, which metadata is understood as data that refers to the design and specification of the cached data, is included in the file system to become available at the other hosts.

In one embodiment, the file system is completely hidden, and may be embodied as one of a GPFS (General Parallel File System), a GLUSTERFS (Gluster File System) or a CEPH file system.

The clustered file system, such as the GPFS, as a result is used in a non-standard way here. Namely, it is used for storing the metadata of the host's cache. For instance, each one of the host caches will store files that describe the data that is stored in the cache and which portions of that data has been invalidated due to user writes. In one embodiment, the metadata is stored at each host in a reserved space of a memory which may be the same memory acting as a cache or a different memory, such as a DRAM of the host. The reserved memory space may, for example, claim less than 5% of the overall memory space of the cache if implemented in the cache memory. In other embodiments, the metadata may be stored in a reserved storage space of an HDD or of another storage means assigned to the host. The reserved memory or storage space is assigned to the clustered file system, and is managed by a file system manager. Since the clustered file system is coherent and available on all the host nodes, these cache metadata will also be available and allow the other caches to have a coherent view of which data has been cached where. When a piece of cached data is invalidated on one of the hosts, the invalidation is immediately reflected on the cache metadata, and this information is thus available to the other hosts of the set as well.

In one embodiment, a clustered computerized system contains a set of multiple hosts, each of which hosts is assigned a solid state memory, e.g. a form of one or more Flash-based SSDs as cache. The multiple solid state memories of or assigned to the multiple hosts may, in total, be considered as a cache for the entire computerized system. Data relevant to an application running on multiple hosts of the set may be distributed to storage devices assigned to the various hosts, and, as such, data frequently accessed may be stored in the various solid state memories. In such a system, a cache manager containing cache management code, for example, may be used for operating the cache and may be distributed across the individual solid state memories, or may be running on a central entity. In one embodiment, the cache management code logic runs on a controller assigned to the host.

SSDs contributing to an overall cache for the computerized system may be organized in a single logical address space using RAID or any other scheme. The data to be cached is stored on the SSDs, while metadata describing the cached data may be stored in a volatile DRAM memory, or on the SSDs themselves building the cache themselves along with the cache data.

As an example, a host server is equipped with one or more Direct-Attached SSDs and uses the SSDs as a caching layer between the server's main memory and the storage that is direct-attached to the server (e.g., local HDDs) or accessed over a SAN network (e.g., a storage controller connected to the host via a Fibre-Channel network).

In view of the usage of solid state memories as host-based caches, the I/O performance of the respective hosts is improved, thereby accelerating the workloads running on these hosts.

In one embodiment, multiple host servers contribute to a cluster, where the host servers communicate over a network with one another. A clustered file system is provided to support a clustering and coherence of distributed block-level caches embodied in each of the host servers of the set. The file system may be hidden from the user and may be used solely for the purpose of storing cache metadata. The file system, such as GPFS, may be used for storing the metadata of the data cached therein. For instance, each one of the caches will store files that describe the metadata that are stored in the cache and which portions of that cached data has been invalidated due to user writes. Since the clustered file system is coherent and available on all the host nodes, these cache metadata will also be available and allow the other caches to have a coherent view on which data has been cached where. When a piece of cached data is invalidated on one of the hosts, the invalidation is immediately reflected on the cache metadata and this information is thus available to the other hosts as well. Hence, shared data can be cached by different hosts, with the clustered caches ensuring coherent access to that data in view of the file system operating on the metadata of the cached data.

FIG. 1 is a block diagram of a clustered computerized system according to an embodiment of the present invention. A host 1 is shown, while the clustered computerized system may contain a set of multiple of such hosts as nodes interconnected with each other. The present host (computer) 1 is connected to a storage system 3, which in the present figure is indicated as an array of hard disk drives (HDD). The host 1 may require access to the storage system 3 for reading and/or writing data. In between the host 1 and the storage system 3, a solid state memory 2 is arranged in form of a flash memory. The solid state memory 2 is used as a cache for temporarily storing data that have one or more duplicates and may be frequently accessed for reading and/or writing from or to the storage system 3. A controller for the cache operations is referred to as 4. A controller for managing the solid state memory 2 as such is referred to as 5. The functions of the controllers 4 and 5 may in different embodiments be implemented by a common hardware processing unit, or may be addressed by individual processing units. The controllers 4 and 5 may each or commonly reside at a location of the solid state memory 2 or elsewhere. The solid state memory 2 may be arranged at the location of the storage system 3 or at the location of the host 1.

Figure 2:
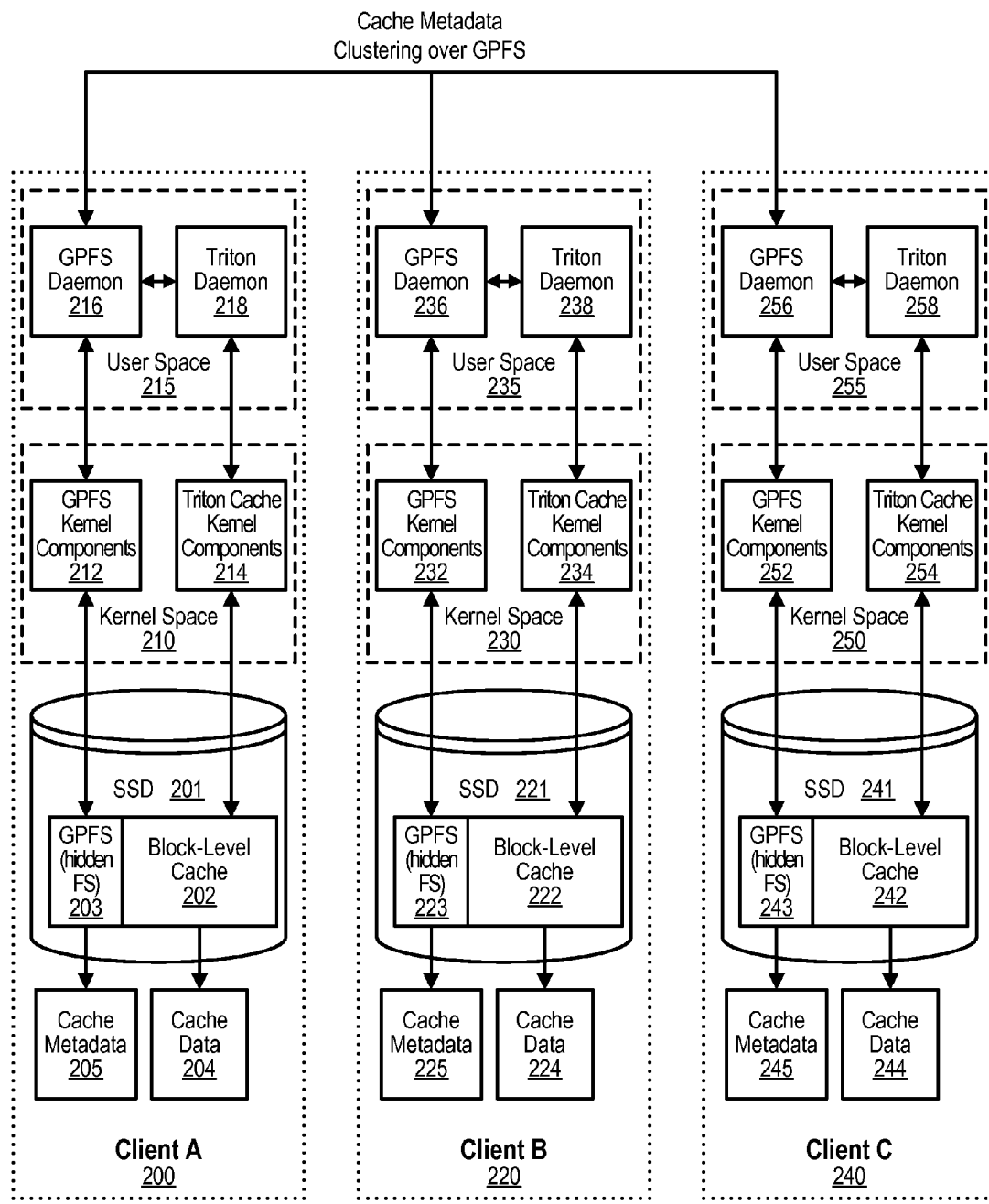
FIG. 2 is a block diagram of a computerized system according to an embodiment of the present invention.

FIG. 2 is a block diagram illustrating a clustered computerized system containing three host nodes A (200), B (220) and C (240). These host nodes are also referred to as clients A, B and C. Each host nodes A, B and C contains a solid state drive SSD, 201, 221, and 241, respectively. Each solid state drive SSD contains a memory space for the block level caching of data (cache data 204 corresponding to client A, cache data 224 corresponding to client B, and cache data 244 corresponding to client C), from a computer of the host (block-level caches 202, 222, and 242, respectively). In addition, each solid state drive SSD contains a reserved space in the memory for storing metadata of the data cached in the very same solid state drive SSD (GPFS hidden FS 203, 223, and 243, respectively). Such metadata contains, for example, information as to the validity of data residing in the cache—valid or invalid—and other information (cache metadata 205 corresponding to client A, cache metadata 225 corresponding to client B, and cache metadata 245 corresponding to client C). This particular memory space of each solid state drive SSD is part of a clustered file system, which in the present example is embodied as a General Parallel File System GPFS. Hence, the metadata stored in the assigned memory spaces of the various solid state drives SSD contributes to a file system that can be accessed at each other of the nodes and supplies information to each node as to the validity of the presently cached data, for example.

In a software oriented view, a clustered file system client is arranged at each node including file system kernel components (Client A's Kernel Space 210 includes GPFS Kernel Components 212, Client B's Kernel Space 230 includes GPFS Kernel Components 232, and Client C's Kernel Space 250 includes GPFS Kernel Components 252) which manage the data residing in the assigned memory space. In addition, a deamon denoted as GPFS deamon running in the user space is responsible for interacting with a remote file system manager (Client A's User Space 215 includes GPFS Daemon 216, Client B's User Space 235 includes GPFS Kernel Components 236, and Client C's User Space 255 includes GPFS Kernel Components 256). At the same time, the file system deamon (216, 236, and 256) is configured to interact with a deamon assigned to the caching function (218, 238, and 258, respectively). While a cache kernel component (214, 234, and 254) is responsible for populating the cache with the suitable data the corresponding deamon denoted as Triton deamon may interact with the file system deamon (Client A's Triton Daemon 218 interacts with GPFS Daemon 216, Client B's Triton Daemon 238 interacts with GPFS Daemon 236, and Client C's Triton Daemon 258 interacts with GPFS Daemon 256), and e.g. supply information that a portion of the metadata (Client A's metadata 205, Client B's metadata 225, and Client C's metadata 245), in the local solid state drive SSD (Client A's local SSD 201, Client B's local SSD 221, and Client C's local SSD 241) was updated and as a result previously valid data entries in the cache now became invalidated. Such information may then be forwarded by the file system deamon to the file system manager for general availability also to the other nodes.

Figure 3:
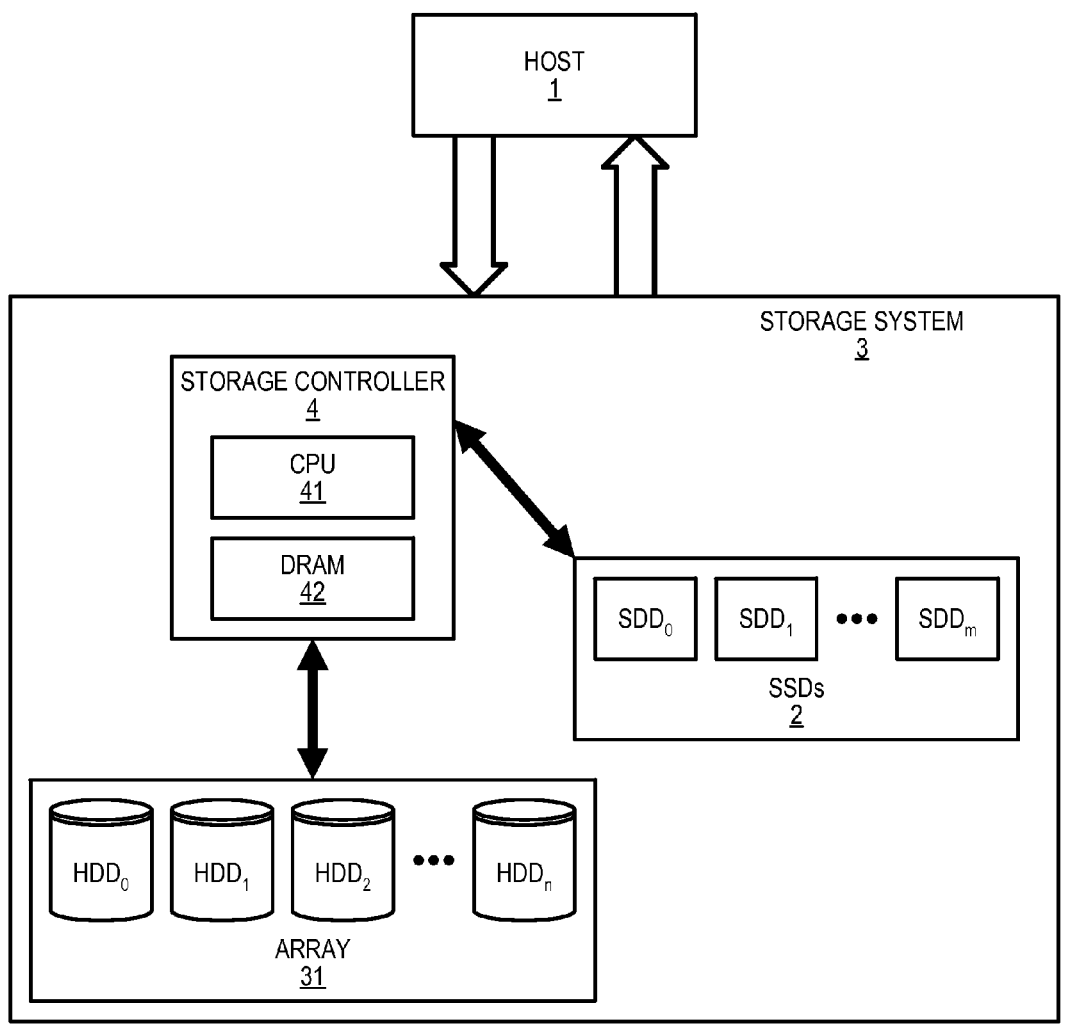
FIG. 3 is a block diagram of a computerized system according to an embodiment of the present invention.
Figure 4:
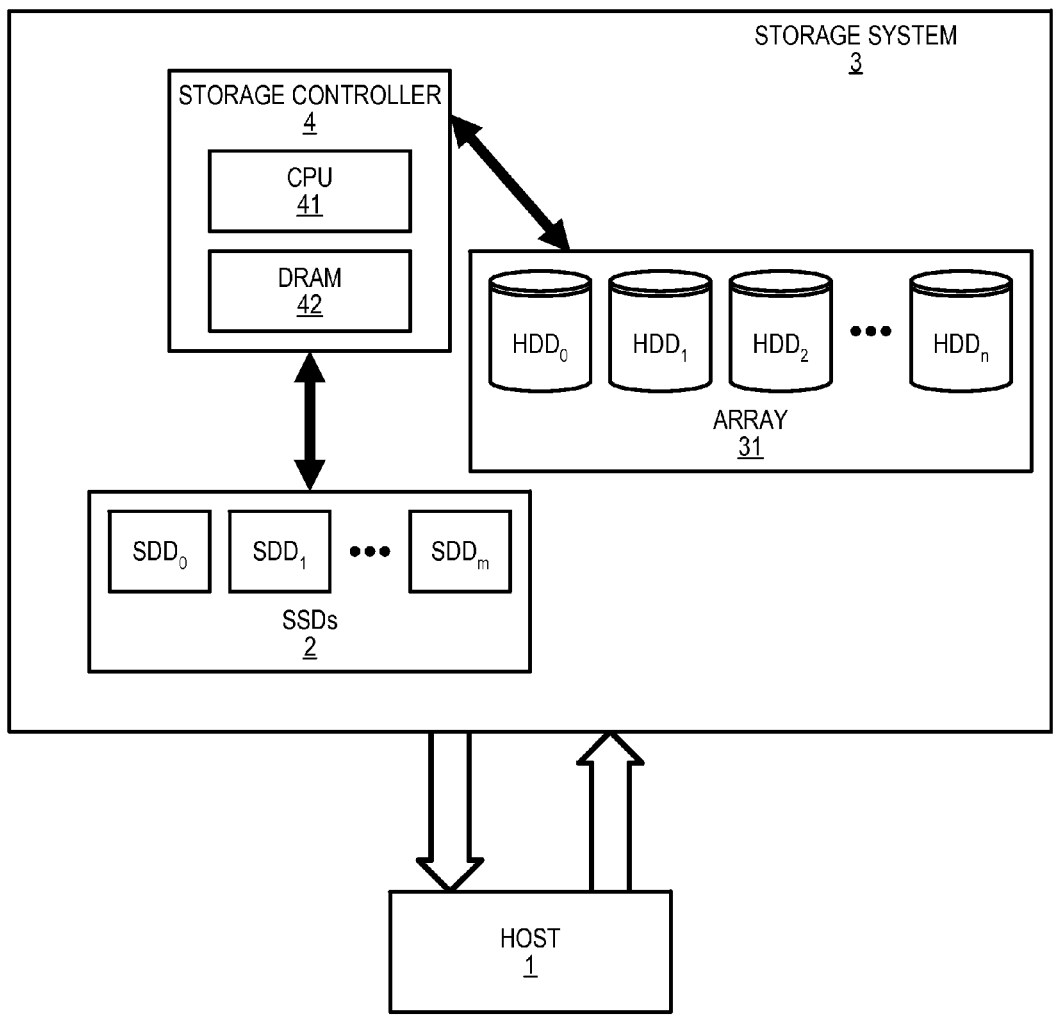
FIG. 4 is a block diagram of a computerized system according to an embodiment of the present invention.

The present invention is applicable to multiple storage system architectures including but not limited to the architectures shown in FIG. 3 and FIG. 4. FIG. 3 shows a host (computer) 1 connected to a storage system 3. The solid state memory 2 contains an array of SSDs, is part of the storage system 3, is used as a cache, and is controlled by a storage controller 4, which in addition assumes the cache control. The controller 4 is equipped with a DRAM memory 42, and a CPU 41. The backend medium for storing data is an array 31 of direct-attached HDDs. One or more of the SSDs 2 are used as a caching layer between the DRAM cache 42 of the controller 4 and the array 31 of HDDs as backend of a storage system. This computerized system may specifically contain a flash cache in or related to a storage controller of a Storage-Area Network (SAN). The metadata of the cached data may reside in one or more of the solid state drives, or, alternatively may reside in the DRAM memory 42 of the storage controller 4. The respective memory space portion may be included in the clustered file system.

FIG. 4 shows a block diagram of another embodiment of a computerized system. Here, a host 1 in form of a server is equipped with a solid state memory 2 containing one or more direct-attached SSDs used as a cache between the server's main memory in form of DRAM 42 and the storage in form of an array 31 of HDDs that is direct-attached to the server, or is accessed over a SAN network (e.g., by means of a storage controller connected to the host via a Fibre-Channel network). This computerized system may hence specifically be a host-based flash cache on a direct-attached SSD. The metadata of the cached data may reside in one or more of the solid state memory 2, or, alternatively may reside in the DRAM memory 42 of the storage controller 4. The respective memory space portion may be included in the clustered file system. Schematically, a link is shown to another host 1 of the clustered computerized system.

Figure 5:
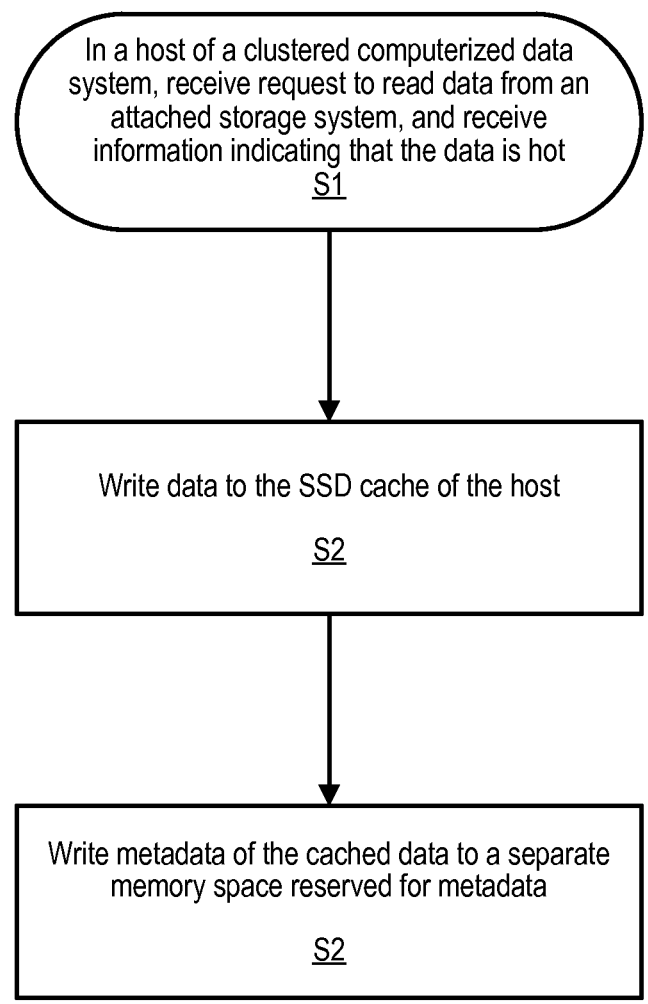
FIG. 5 is a flow chart of a method for operating a clustered computerized system according to an embodiment of the present invention.

FIG. 5 illustrates a flowchart representing a method according to an embodiment of the present invention. In a host of a clustered computerized system a piece of data is to be read from an attached storage system. At the same time, an algorithm provides the information, that this piece of data is now hot enough for being accepted in the cache of the host. This all is achieved in step S1. In step S2, the piece of data is written to the cache of the host which cache is embodied in a solid state memory. In step S3, metadata of the cached data is also written to the cache to a separate memory space reserved for writing metadata to. This memory space at the same time represents a part of a clustered file system, such that the metadata, and as such the characteristics of the cached data, is visible to all hosts in the set contributing to the clustered computerized system As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A clustered computerized system, comprising:
   a set of hosts that includes a first host and a second host, wherein each host in the set of hosts includes at least one processor;
   a network infrastructure for interconnecting the hosts of the set;
   a set of solid state memories, each one of the set of solid state memories comprised in one host in the set of hosts, wherein each solid state memory in the set of solid state memories caches data and metadata of the cached data corresponding to its respective host;
   a clustered file system shared between the hosts of the set that provides the first host with coherent and transparent access to the metadata corresponding to the cached data of the second host, wherein the clustered file system stores the metadata and does not store the cached data; and
   a set of first kernel components and a set of second kernel components executing on each of the set of hosts, wherein the set of first kernel components corresponds to the clustered file system and manages the metadata, and wherein the set of second kernel components manages the cached data.

2. The computerized system according to claim 1, comprising:
   a cache manager for managing the caching of the data in the set of solid state memories;
   a file system manager for managing the clustered file system; and
   an interface between the cache manager and the file system manager for including the metadata of the cached data in the clustered file system.

3. The computerized system according to claim 1, wherein the computerized system is configured to store the metadata in a memory space of the set of solid state memories assigned to the clustered file system.

4. The computerized system according to claim 1, further comprising:
   a controller assigned to each host of the set of hosts, each controller configured to cache data in the solid state memory assigned to the respective host, and each controller further configured to store the metadata of the cached data in the solid state memory assigned to the respective host.

5. The computerized system according to claim 4, wherein each controller is configured to store the metadata of the cached data in a memory space assigned to the clustered file system.

6. The computerized system according to claim 4, wherein at least one of the controllers is selected from the group consisting of a controller for the set of solid state memories, a controller for a storage system attached to the host, and a controller for the host.

7. The computerized system according to claim 1, further comprising:
   a main memory in each host of the set, wherein each main memory includes a volatile memory; and
   wherein the computerized system is configured to store the metadata in a memory space of the volatile memories assigned to the clustered file system.

8. The computerized system according to claim 7, further comprising:
   a controller assigned to each host of the set of hosts, each controller being configured to cache data in the solid state memory assigned to the respective host, and each controller being further configured to store the metadata of the cached data in the volatile memory of said host.

9. The computerized system according to claim 8, wherein each controller is configured to store the metadata of the cached data in the memory space of the volatile memory assigned to the clustered file system.

10. The computerized system according to claim 1, wherein the clustered file system is selected from the group consisting of a General Parallel File System (GPFS), a Gluster File System (GLUSTERFS), and a Ceph file system (CEPH).

11. The computerized system according to claim 1, wherein the clustered file system is configured as a file system hidden to a user of the computerized system.

12. The computerized system according to claim 1, wherein the clustered file system is configured as a file system solely for the purpose of storing the metadata of the cached data.

13. A method for operating a clustered computerized system, the clustered computerized system comprising a set of hosts and a network infrastructure for interconnecting the hosts of the set, the method comprising:
   caching data in one or more solid state memories in a set of solid state memories, each one of the set of solid state memories comprised in one host in the set of hosts, wherein the set of hosts includes a first host and a second host;
   including metadata of the cached data in a clustered file system, wherein the clustered file system provides the first host with coherent and transparent access to the metadata corresponding to the cached data of the second host, wherein the clustered file system stores the metadata and does not store the cached data; and
   executing a set of first kernel components and a set of second kernel components on each of the set of hosts, wherein the set of first kernel components corresponds to the clustered file system and manages the metadata and the set of second kernel components manages the cached data.

14. The method according to claim 13, further comprising:
   storing the metadata of the cached data in a memory space of the set of solid state memories assigned to the clustered file system.

15. A computer program product comprising a non-transitory computer readable medium having computer readable program code embodied therewith, the computer readable program code comprising computer readable program code configured to perform a method comprising:
   caching data in one or more solid state memories in a set of solid state memories, each one of the set of solid state memories comprised in one host in the set of hosts, wherein the set of hosts includes a first host and a second host;
   including metadata of the cached data in a clustered file system, wherein the clustered file system provides the first host with coherent and transparent access to the metadata corresponding to the cached data of the second host, wherein the clustered file system stores the metadata and does not store the cached data; and
   executing a set of first kernel components and a set of second kernel components on each of the set of hosts, wherein the set of first kernel components corresponds to the clustered file system and manages the metadata and the set of second kernel components manages the cached data.

16. The computer program product of claim 15, wherein the method further comprises:
   storing the metadata of the cached data in a memory space of the set of solid state memories assigned to the clustered file system.

* * * * *